United States Patent [19]
Bowness

[11] 3,855,544
[45] Dec. 17, 1974

[54] FREQUENCY SELECTIVE OUTPUT COUPLING FOR LASERS

[75] Inventor: Colin Bowness, Weston, Mass.

[73] Assignee: Raytheon Company, Lexington, Mass.

[22] Filed: Oct. 28, 1966

[21] Appl. No.: 590,350

[52] U.S. Cl. ............................... 331/94.5, 356/112
[51] Int. Cl. ............................................. H01s 3/08
[58] Field of Search .................................. 331/94.5; 356/106–113

[56] References Cited
UNITED STATES PATENTS
| | | | |
|---|---|---|---|
| 3,402,365 | 9/1968 | Uchida | 331/94.5 |
| 3,414,840 | 12/1968 | Di Domenico, Jr. | 331/94.5 |
| 3,504,299 | 3/1970 | Fox | 331/94.5 |

OTHER PUBLICATIONS

Fontana, Modes in Coupled Optical Resonators with Active Media. IEEE Transactions on Microwave Theory and Techniques, (July 1969) pp. 400–405.

Buser et al., Interferometric Measurements of Rapid Phase Changes in the Visible and Near Infrared Using a Laser Light Source. Appl. Optics Vol. 3, No. 12, (December 1964) pp. 1495–1499.

Crocker et al., Stimulated Emission in the Far Infrared. Nature, Vol. 201, No. 4916, (Jan. 18, 1964) pp. 250 & 251.

Gebbie et al., Interferometric Observations on Far Infra-red Stimulated Emission Sources. Nature, Vol. 204, No. 4928 (April 11, 1964) pp. 169 & 170.

Smith, Stabilized, Single Frequency Output from a Long Laser Cavity. IEEE J. Quantum Electronics, Vol. QE-1, No. 8 (Nov. 1965) pp. 343–348.

*Primary Examiner*—William L. Sikes
*Attorney, Agent, or Firm*—Joseph D. Pannone; Milton D. Bartlett; Herbert W. Arnold

[57] ABSTRACT

A frequency selective output coupling positioned within a laser resonant cavity including a laser medium, a cavity axis and end reflectors, the coupling comprising a partial reflecting means positioned adjacent the laser medium at a selected angle to the cavity axis for coupling energy out in two coaxial oppositely directed beams, and adjustable reflecting means positioned in one of the beams to reflect it back along itself and through the partially reflecting means to superimpose the two beams to form an output beam.

8 Claims, 6 Drawing Figures

INVENTOR
COLIN BOWNESS

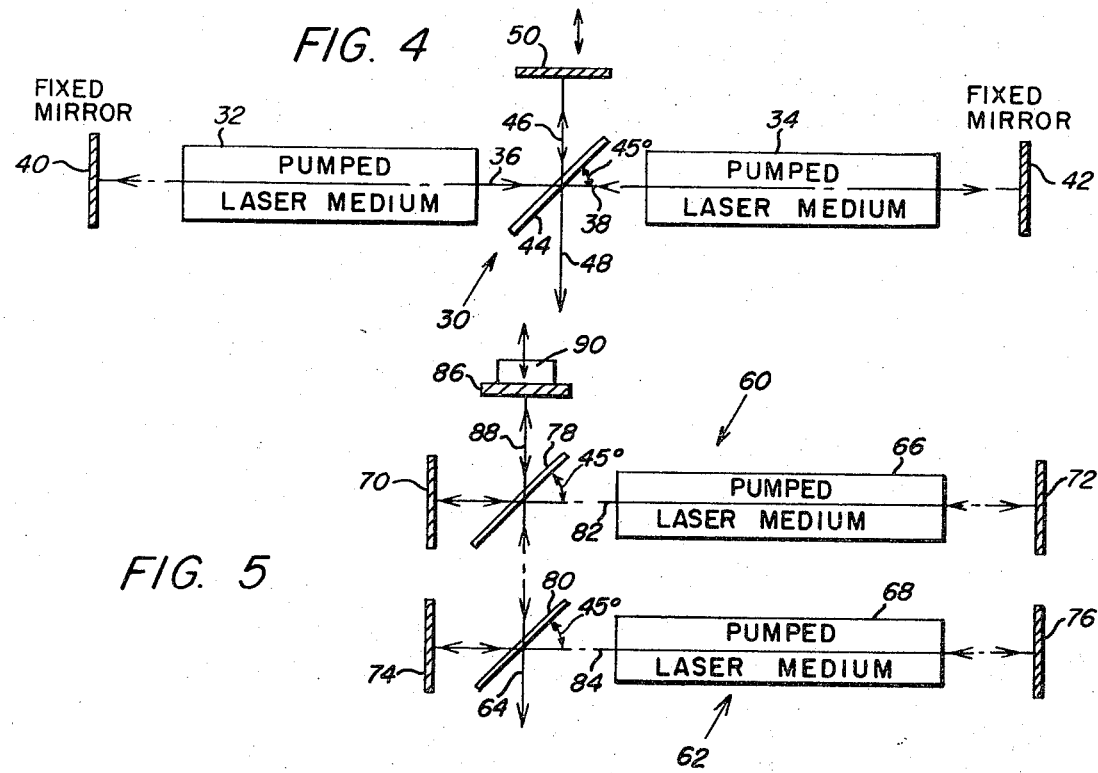
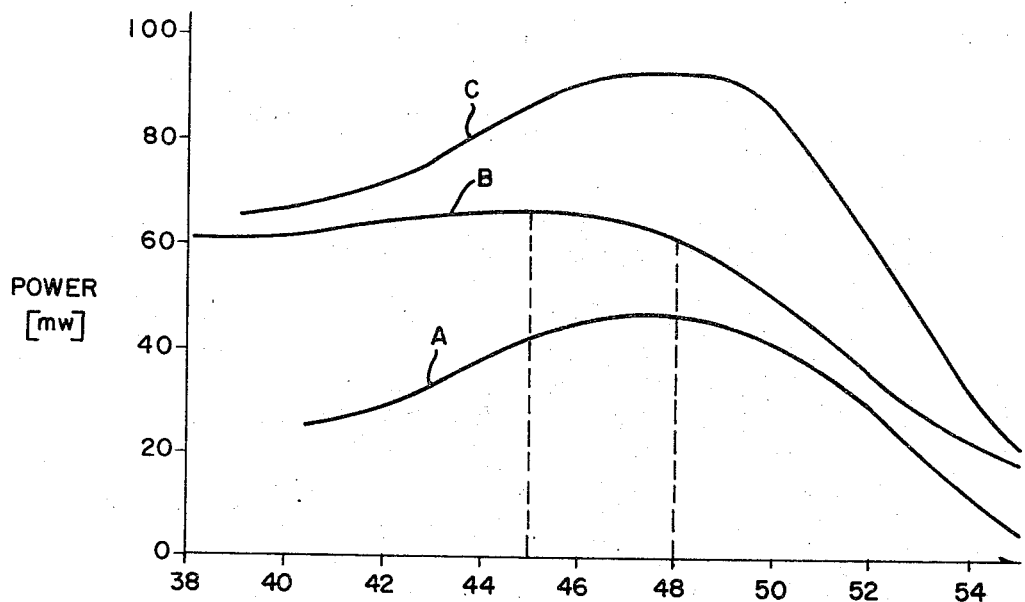

FREQUENCY SELECTIVE OUTPUT COUPLING FOR LASERS

The present invention relates to lasers and, more particularly to an output coupling for lasers.

The power of a single laser is limited by the laser size, mainly, the length of the active resonator. In order to increase the power of a single laser it is necessary to correspondingly increase the length of the active resonator. However, to increase this length requires some adjustment. An optical resonator which contains a laser material has many modes which will experience gain, and the laser output will consist of many discrete frequencies. It is possible to restrict the oscillation to the fundamental transverse mode by either introducing an aperture of the appropriate size into the laser cavity or by increasing the mode volume. The output, however, will still consist of a number of frequencies called the longitudinal resonances of the cavity and separated by $C/2L$ where $C$ is the velocity of light and $L$ the length of the laser cavity. The laser will oscillate at a single frequency only if $L$ is made sufficiently short. Therefore, to employ a longer length of active resonator to obtain greater output power, it becomes necessary to suppress the unwanted longitudinal resonances to obtain a single-frequency output.

One approach to this problem involves suppressing the unwanted resonances inside the laser cavity so that only a single frequency experiences gain. This frequency selective system may then be employed to increase laser output power by coupling the output beams of several lasers together into a single output beam to increase the power output over that which would be obtainable by using only one laser.

In order to accomplish the coupling of a plurality of lasers there are several possible arrangements which include: (1) laser elements in series formation, folded within a single cavity; (2) laser elements in series formation, folded outside several cavities; (3) laser cavities parallel, mixing of beams by a beam splitter inside each cavity; (4) laser cavities parallel, mixing of beams by a beam splitter outside each cavity; and (5) laser cavities parallel, mixing of beams by diffraction. Of the above possible arrangements, (3) in which the laser cavities are parallel and the laser beams are mixed by a beam splitter within each cavity appears to be the best approach. Arrangement (1) is very expensive and difficult to tune. Scheme (4) has poor efficiency, is difficult to align, while scheme (5) is very easy to accomplish, but has a near beam pattern of large diameter and multiple spots. Although scheme (5) can be focused into multiple narrow beams, aberration and losses are considerable.

Thus, arrangement (3) which has laser cavities parallel and mixes the beams by placing a beam splitter inside each cavity has advantages which include accurate alignment, high coupling efficiency, very little interaction between the different resonator cavities with radial multimode operation, and output in a single beam similar to that of a single laser with the same diameter and beam divergence. It is this last advantage of combining the output beams of a plurality of lasers into a single output beam to increase power output which the arrangement of the parallel laser cavities and the beam splitter inside each cavity accomplishes and which none of the other abovementioned schemes are capable of accomplishing.

It is therefore an object of the present invention to overcome the power output deficiencies of the prior art.

It is another object of the present invention to provide a frequency selective output coupling for a laser which is capable of increasing the output power of the laser.

Yet another object of the present invention is to provide a frequency selective output coupling for combining the outputs of a plurality of lasers into a single output in order to increase the power output therefrom.

Another object of the present invention is to provide a variable output coupling for a laser cavity.

The above objects and advantages of the present invention are accomplished by providing a frequency sensitive output coupling for a laser comprising a partial reflecting means associated with the laser resonant cavity and an adjustable reflecting means for directing the output beam.

More particularly, the above objects of this invention are accomplished by providing a frequency sensitive output coupling for lasers comprising a partially reflecting surface within the laser resonant cavity at 45° to the cavity axis for coupling energy out in two coaxially oppositely directed beams, and a movable reflector positioned in one of the beams to reflect it back along itself to superimpose the two beams, the spacing of the reflector from the cavity axis controlling the phase of the reflected signal, and providing means for mode selection.

With these and other objects in view as will hereinafter more fully appear, and which will be more particularly pointed out in the appended claims, reference is now made to the following description taken in connection with the accompanying drawings in which:

FIG. 4 shows an alternative embodiment of the present invention;

FIG. 5 shows an application of the embodiment of the invention shown in FIG. 1; and FIG. 6 is a plot of the output results obtained from different variations of the present invention.

In the drawings like reference characters designate like or corresponding parts throughout the several views.

Figure 1:
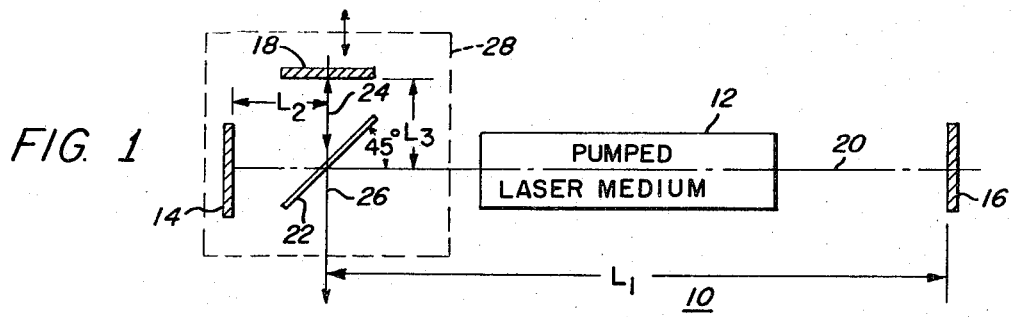
FIG. 1 shows an embodiment of the present invention.

FIG. 1 illustrates an embodiment of the present invention in which there is shown a laser resonant cavity 10 including a pumped laser medium 12. The laser medium 12 may be solid, liquid or gas and may be pumped by any suitable means, e.g., optically, r.f. discharge or d.c. discharge. Also included within the laser resonant cavity 10 are three reflecting mirrors 14, 16 and 18. Reflecting mirrors 14 and 16 are positioned within the cavity 10 at opposite ends of the laser medium axis designated as 20. The three mirrors 14, 16, and 18 are 100 percent reflecting and may be metallic or comprise multiple layers of dielectric coatings designed for maximum reflectivity at the laser frequency. The surfaces of the reflecting mirrors 14, 16 and 18 may be plane or spherical but for purposes of description are shown as being plane in FIG. 1.

The mirror 18 is a movable mirror as indicated by the doubleheaded arrow to shorten or lengthen the optical path between it and the beam splitter 22. Within the laser resonant cavity 10 a partially reflecting surface or beam splitter 22 is positioned at 45° to the axis 20 of the cavity 10. The partially reflecting surface or beam splitter 22 permits energy to be coupled out of the cavity 10 in two coaxial beams designated as 24 and 26 as shown by the two oppositely directed arrows. The two coaxial beams are oppositely directed and orthogonal to the cavity axis 20. The movable mirror 18 is positioned in one of the two coaxial beams, which for purposes of description is beam 24 in FIG. 1, to reflect that beam back along itself, as illustrated by the oppositely directed arrowhead. The distance from which the movable mirror 18 is spaced from the partially reflecting surface 22 determines the output coupling as follows. If the movable mirror 18 were absent, beams of equal amplitude would be coupled out in opposite directions. The movable mirror 18, however, reflects beam 24 back along itself and back through the beam splitter 22. In this manner the two beams 24 and 26 are superimposed and the electric vectors associated with the individual beams will add or cancel depending upon the relative phase of the two signals. The phase of the reflected signal will depend upon the spacing of the movable mirror 18 from the laser cavity axis 20. If the partially reflecting surface usually reflects X per cent of the incident power (at 45° incidence), then the range of coupling obtained by varying the movable mirror 18 is from 0 to 4X per cent since complete cancellation is possible when the vectors oppose. When the vectors add, the electric field amplitude is doubled, representing a factor of 4 in power coupling.

Figure 2:
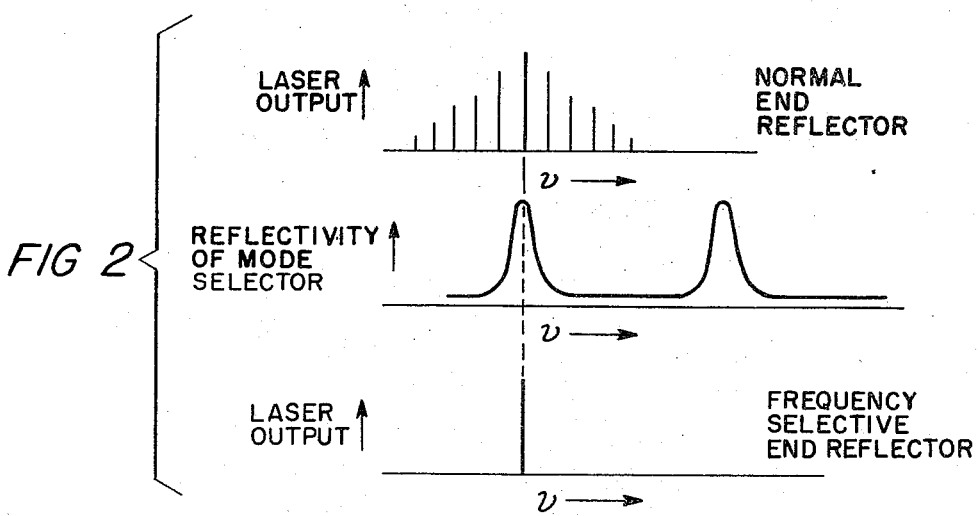
FIG. 2 is a graph of the reflection characterstics of the embodiment of the invention shown in FIG. 1.

The two reflecting mirrors 14 and 18 and the partially reflecting surface 22 act as an end reflector of variable reflectivity. They form a frequency selective end reflector or resonant cavity 28 havng the property that incident radiation at a resonant frequency of the cavity is reflected back towards the pumped laser medium 12, whereas radiation at a frequency far from resonance is deflected out of the system. FIG. 2 shows the reflection characteristic of the frequency selective end reflector 28. The top portion of FIG. 2 illustrates the frequency characterstics of a normal end reflector, while the bottom portions indicate the characteristics of the frequency selective end reflector 28 of the present invention. The separation between the resonances is determined by $L_2 + L_3$ where $L_2$ is the distance from the mirror 14 to the coaxial beam 24 and $L_3$ is the distance from the movable mirror 18 to the axis 20, and the width of the resonances is determined primarily by the transmissivity of partially reflecting surface 22 if reflecting mirrors 14 and 18 are assumed to have zero transmissivity. FIG. 2 illustrates that a basic feature of the output coupling is that it is frequency selective and provides a simple means of selecting a single mode from several which may exist within the laser cavity and which would normally be coupled out by conventional means. This result is achieved because only one frequency experiences sufficiently low losses to oscillate in the laser cavity. As a simple example of the mode selectivity, suppose that the florescent line width of the laser material is such that it is possible for five longitudinal modes to exist within the primary laser cavity 10. If the movable mirror 18 is spaced a distance away from the cavity axis 20 which is one-fifth or less of the cavity length $L$, only one mode will be coupled out. Similarly, if it is desired to couple out all possible modes, the distance of the movable mirror from the cavity axis should be equal to the cavity length $L$.

The theoretical operation of the frequency selective end reflector 28 which comprises the reflecting mirrors 14 and 18 and the partially reflecting surface 22, which for purposes of description will be $M_3$, $M_4$ and $M_2$ respectively, is as follows:

Consider a wave $e^{i\omega t}$ incident from the right on mirror $M_2$ of FIG. 1. The wave which returns in the opposite direction to the incident one will be:

$$\tau_2^2 p_3 \left[ 1 - p_3 p_4 p_2^2 \exp\left(\frac{4\pi i}{\lambda}(L_2+L_3)\right) \right]^{-1} \cdot \exp\left(i\omega t + \frac{4\pi i L_2}{\lambda}\right) \quad (1)$$

where $p_i$ and $\tau_i$ are, respectively, the voltage reflection and transmission coefficients of mirror $M_i$ and $\lambda$ is the wavelength of the wave. If the laser medium in arm $L_1$ has a round trip voltage gain $g$, then the wave returning to mirror $M_2$ will be $$g\tau_2^2 p_3 p_1 \left[ 1 - p_3 p_4 p_2^2 \exp\left(\frac{4\pi i}{\lambda}(L_2+L_3)\right) \right]^{-1} \cdot \exp\left(i\omega t + \frac{4\pi i}{\lambda}(L_1+L_2)\right). \quad (2)$$

Imposing the self-consistent condition that equation (2) must equal $e^{i\omega t}$ one obtains $$g = \frac{1 - p_3 p_4 p_2^2 \exp\left(\frac{4\pi i}{\lambda}(L_2+L_3)\right)}{p_1 p_3 \tau_2^2 \exp\left(\frac{4\pi i}{\lambda}(L_1+L_2)\right)}. \quad (3)$$

The requirement that the gain $g$ be real gives the resonance condition $$\sin 4\pi/\lambda \, (L_1 + L_2) = p_3 p_4 p_2^2 \sin 4\pi/\lambda \, (L_1 - L_3) \quad (4)$$

and the power gain $G$ then becomes $$gg^* = G = \frac{(1 - p_3 p_4 p_2^2)^2 + 4 p_3 p_4 p_2^2 \sin^2 \frac{2\pi}{\lambda}(L_2+L_3)}{p_3^2 p_1^2 \tau_2^4} \quad (5)$$

and the fractional power loss $L$ is $$L = 1 - \frac{1}{G} = 1 - \frac{p_3^2 p_1^2 \tau_2^4}{(1 - p_3 p_4 p_2^2)^2 + 4 p_3 p_4 p_2^2 \sin^2 \frac{2\pi}{\lambda}(L_2+L_3)}. \quad (6)$$

To compute the resonances of the system, the case $p_1 = p_3 = p_4 = 1$; $p_2^2 = \tau_2^2 = 0.5$, will be considered. It can be seen from equations (5) and (6) that for the case $L_2 + L_3 = m\lambda/2$; $L_1 + L_2 = n\lambda/2$ where $m$ and $n$ are integers, the gain is equal to one and there are no losses in the system. Thus no power is reflected out by mirror $M_2$. Let $\lambda'$ be another resonance of the system. Then from equation (4), $$\sin [2\pi n\lambda/\lambda'] = (0.5) \sin [2\pi(n-m)\lambda/\lambda']. \quad (7)$$

Figure 3:
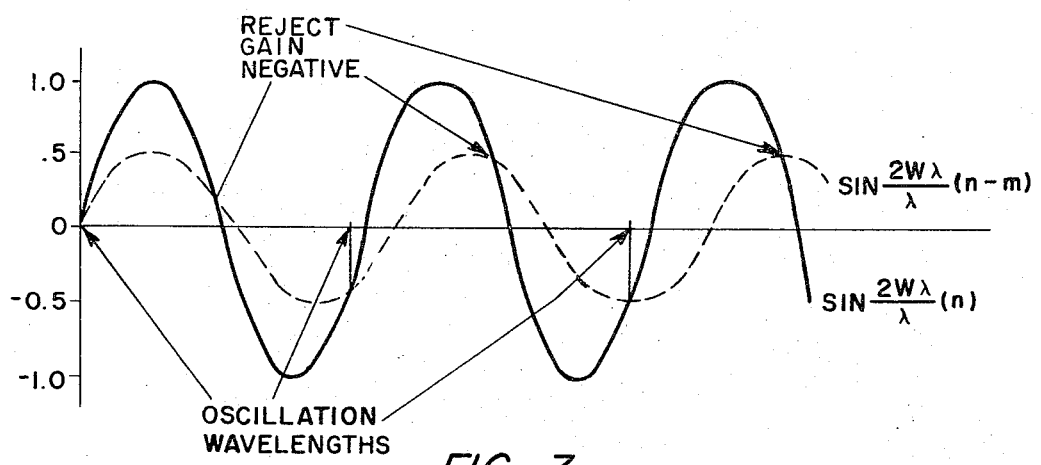
FIG. 3 shows a graph of other characteristics of the embodiment of the invention shown in FIG. 1.

The two sides of equation (7) are plotted in FIG. 3 for the case $m = n/10$. The intersections of the solid and dashed curves correspond to solutions of equation (7). Note that half the solutions are rejected as they correspond to negative gain.

Equation (7) has been solved numerically for the case $m = n/10$. It is found that for the next resonance away from the one with no loss, the loss given by equation (6) is $$L = 0.40.$$

If one estimates the absorption and scattering power losses at each mirror surface to be 0.2 percent, equation (6) can be used to find the theoretical loss for the "on resonance" frequency. One obtains a power loss of $$L = 0.016.$$

It is thus seen that even with a power reflectivity of 0.5 for $M_2$, the longitudinal mode selector discrimnates strongly against unwanted cavity resonances. Greater discrimination can, of course, be obtained by increasing $p_2^2$, but this also increases the "on resonance" loss of the system.

While mirror 18 has been described as being movable in the embodiment of the invention described in FIG. 1, it should be pointed out that mirrors 14 or 16 could also be moved or that either 14 or 16 could be moved instead of mirror 18. Such flexibility is desirable as can be seen from FIG. 2, as it might be necessary to have these other mirrors movable in order to center one of the resonances on the center of the fluorescent line.

FIG. 4 shows an alternative embodiment of the invention shown in FIG. 1. In FIG. 4 a laser resonant cavity 30 has the laser medium separated into two parts 32 and 34, which may have advantages from a packaging viewpoint, for example in folded gas lasers. The axes 36 and 38 of the two laser mediums 32 and 34 respectively are identical. Positioned at opposite ends of the laser medium axes 36 and 38 are fixed mirrors 40 and 42 which have 100 percent reflectivity. Partially reflecting surface 44 is positioned between the two laser mediums 32 and 34 at 45° to the cavity axes 36 and 38. As in FIG. 1, partially reflecting surface 44 acts to couple energy out of the cavity 30 in two coaxial beams 46 and 48, oppositely directed and orthogonal to the cavity axes 36 and 38. The movable reflector 50 is positioned in beam 46 on the common axis of beams 46 and 48 and reflects beam 46 back along itself as indicated by the arrowhead. The embodiment of FIg. 4 couples energy out of the cavity 30 in the same manner as the embodiment of FIG. 1. A possible modification of the embodiment shown in FIG. 4 would be to couple a third laser element by placing it between the partially reflecting surface 44 and the movable mirror 50. In such case, the reflected wave would be returned with an electric vector greater than the incident wave while still permitting vector addition. Such a system could be of use with gas lasers.

A very significant advantage of the present invention which is not achievable by the prior art is that it enables the output beams from a number of lasers to be coupled into a single output beam to thereby increase laser power output capabilities. The present invention as employed in FIG. 5 illustrates that mutual coupling exists between two laser cavities 60 and 62 which enables phase locking to be accomplished automatically. As mentioned earlier, the distance from the movable mirror to the laser cavity axis is critical and thus the separation of the two laser cavities 60 and 62 shown in FIG. 5 must be variable. Such variable separation is necessary because after the laser 60 has been initially set in the correct position, then the second laser 62 must be adjusted with respect to the movable mirror. Theoretically, it should be possible to couple any number of lasers together by employing the present invention.

FIG. 5 illustrates an embodiment of the present invention in which the two laser cavities 60 and 62 have their outputs coupled into a single output beam 64. Each laser cavity 60 and 62 has its own laser medium 66 and 68 respectively, fixed end mirrors 70, 72 and 74, 76 respectively, and partial reflecting surfaces or beam splitters 78, 80 at 45° to their respective cavity axes 82, 84. Movable mirror 86 is positioned in beam 88 adjacent the beam splitter 78. Although only two cavities 60 and 62 are shown, it is possible to employ the present invention with any number of laser cavities. Even if the laser cavities 60 and 62 have different frequencies, by employing the frequency selective output coupling means of the present invention, it is possible to couple the output beams of each of the laser cavities 60 and 62 into a single optical path as illustrated by output beam 64.

The outputs of the laser cavities shown in FIGs. 1, 4 and 5 may be modulated by modulating the position of each of the movable mirrors by a means such as mounting it on a piezoelectric transducer 90 as shown in FIG. 5. Such arrangement would offer a simple way of adjusting the power output of the laser cavities and might be especially valuable in a feedback loop used to maintain a constant output power level. In many lasers it is not possible to alter the output rapidly by altering the pump power since intermediate processes of long time constant are involved. This difficulty, however, is avoided by mounting the movable mirror 86 on the piezoelectric transducer 90. It should be pointed out, as was done with respect to FIG. 1, that mirrors 70 or 74 may be made movable in addition to mirror 86.

In many lasers, the radiation in the cavity is plane-polarized due to anisotropy in the crystal used or, particularly in the case of gas lasers, due to the use of Brewster angle windows. In such lasers it is possible to obtain a reasonable range of output coupling by using Fresnel reflection from common optical materials for the 45° partially reflecting surface or beam splitter. The table below shows the maximum per cent coupling as a function of refractive index, which maximum is 4 times the simple 45° Fresnel reflection.

| Refractive Index | Maximum Coupling (%) |
| --- | --- |
| 1.4 | 1.9 |
| 1.6 | 5.4 |
| 1.8 | 10.4 |
| 2.0 | 16.6 |

The above values were computed assuming that the wave was polarized in the plane of incidence at 45°. Tilting the coupling surface such that the wave was polarized perpendicular to the plane of incidence will give considerably higher values for coupling. Clearly, if the coupling is to be achieved using an optical flat, it will be necessary to anti-reflection coat one side for the 45° angle of incidence, or cut it such that it is at the Brewster angle.

It was found that different types of surfaces could be employed for the partially reflecting surface or beam splitter of the invention. The partially reflecting surface such as surface 22 in FIG. 1 may either have surface reflection or dielectric coatings. For plane polarized light parallel to the plane of incidence of a beam splitter, the reflectivity is:

$$R = \left(\frac{\tan\theta_i - \tan\theta_r}{1 + \tan\theta_i \tan\theta_r}\right)^2 \left(\frac{1 - \tan\theta_i \tan\theta_r}{\tan\theta_i + \tan\theta_r}\right)^2$$

where $R$ is the reflectivity, $\theta_i$ is the angle of incidence and $\theta_r$ is the angle of refraction. For a beam splitter made of fused silica where the refractive index $n$ (which is $\tan\theta_i/\tan\theta_r$) was equal to 1.46, the following values of reflectivity from one surface were obtained using a linear approximation:

| $\theta_i$ | R |
| --- | --- |
| 45° | 0.66% |
| 46° | 0.58% |
| 47° | 0.50% |
| 48° | 0.42% |
| 49° | 0.34% |

The reflectance of the beam splitter may also be varied by using multi-layer dielectric coatings on the surface of the beam splitter so that the beam will reflect at 45° from the resonator axis. However, dielectric coatings have absorption and scattering losses of about 0.5 percent. Also, the minimum reflectance with anti-reflective coatings on the opposite surface of the beam splitter is about 0.25 percent. This loss may be compared with the results obtained from the uncoated beam splitters as described above, in which case the loss was about 0.50 percent for transmission at Brewster's angle. In testing the beam splitters, two 6328A gas laser tubes with Brewster windows, mirrors with dielectric coatings of 99.7 or 98 percent reflectance, beam splitters with dielectric coatings of 1.3 percent reflectance on one side and less than 0.25 percent reflectance on the other, and uncoated fused silica flats of Brewster window quality were used. Power was measured with calibrated photovoltaic silicon cell. All lasers were operating in multi-mode at maximum power output.

The coupling efficient of the coupled lasers is defined by $$\eta = P_{1+2}/P_1 + P_2$$

where $\eta$ is the coupling efficiency, $P_{1+2}$ represents the combined output power of the coupled lasers, $P_1$ represents the individual power output from the laser, and $P_2$ represents the individual power output from the other laser.

One set of results were compiled using the dielectric coated beam splitters and where one of the end reflecting mirrors was a spherical mirror and the other a flat or planar mirror. In this configuration, the coupling efficiency was found to be 88.5 percent. There were two output beams due to back surface reflection. Beam divergence was 1.8 milliradians and no interaction between the beams could be detected. The optical axis of the two laser tubes were moved both parallel and approximately 10° out of parallelism and there was no difference in output power. In another arrangement in which both end reflecting mirrors were spherical mirrors, a higher power output was achieved. Also, the disturbing effect of the diverging beam did not occur. With this configuraton, a power output of 126 mw was achieved using two laser tubes. To indicate the optimum reflectance, the angle of incidence, $\theta_i$, of the beam splitter was varied. The total optimum reflectance plus transmisson losses were 1.85 percent which is a relatively high value indicating that the absorption losses in the cavity were high.

Similar experiments were conducted with uncoated beam splitters. The optimum total reflectance obtained with an uncoated beam splitter was 1.15 percent which indicates that the losses were smaller. In addition, the coupling efficiency was found to be 96 percent as against the 88.5 percent coupling efficiency achieved with the coated beam splitters.

FIG. 6 is a plot of the power versus the angle of incidence, and the three curves indicate the results obtained for both coated and uncoated beam splitters. Curve A represents the power response of a single laser tube using a beam splitter without a dielectric coating. An arrangement including two laser tubes coupled in parallel and employing beam splitters with dielectric coatings of 1.3 percent reflectance at an angle of incidence of 45° has its power response illustrated in Curve B. Curve C shows the power output of an arrangement including two laser tubes coupled in parallel and utilizing beam splitters without any dielectric coatings. The output of Curve C is approximately twice that of Curve A at each angle of incidence showing that output power was doubled when two tubes were coupled together using the present invention. The results of the tests indicated that the quality of dielectric coatings is below that of optically finished surfaces, and these coatings effect the power of high and low gain lasers to a great degree. Therefore, the beam splitters without dielectric coatings provide greater capability for coupling increased power output as can be seen by comparing Curves B and C of FIG. 6. As the result indicated, coupling efficiency was about 88 percent with dielectric coatings on the beam splitters, while 96 percent coupling efficiency was achieved using beam splitters without dielectric coatings. In addition, the above invention when used in coupling the output of a plurality of lasers creates very little interference in radial multi-mode operation, and there is no destructive interference with radial single modes of different frequencies. Also, any cavity geometry may be employed with the present invention. Furthermore, output divergence is the same as through the cavity mirror at the same end as the beam splitter.

Obviously, many modifications and variations of the present invention are possible in the light of the above teachings. It is therefore to be understood that within the scope of the appended claims the invention may be practiced otherwise than as specifically described.

What is claimed is:

1. A frequency selective output coupling for coupling the output beams of a plurality of laser resonant cavities into a single output beam, said plurality of laser resonant cavities each including a laser medium, a cavity axis and end reflectors, wherein said laser cavities are positioned in parallel, said coupling comprising:

partial reflecting means positioned adjacent each of the laser mediums at a selected angle to each cavity axis for coupling energy out in two coaxial oppositely directed beams, and an adjustable reflecting means positioned in one of said beams to reflect it back along itself and back through the partial reflecting means to superimpose said two beams to form a single output beam.

2. A frequency selective output coupling as set forth in claim 1 wherein:
said partial reflecting means comprises a partially reflecting surface within each laser resonant cavity, and
said adjustable reflecting means comprises a movable reflector for superimposing the output beams into a single output beam.

3. A frequency selective output coupling as set forth in claim 2 wherein:
each partially reflecting surface is located within each laser resonant cavity at approximately 45° to said cavity axis for coupling energy out in two coaxial oppositely directed beams orthogonal to said cavity axis, and
the spacing of said movable reflector from said cavity axis controls the phase of the reflected beam and provides means for mode selection.

4. A frequency selective output coupling for coupling the output beams of a plurality of laser resonant cavities into a single output beam, said plurality of laser resonant cavities each including a laser medium, a cavity axis and end reflectors, wherein said laser cavities are positioned in parallel, said coupling comprising:
a partially reflecting surface within each laser resonant cavity positioned adjacent the laser medium at 45° to the cavity axis for coupling energy out in two coaxial oppositely directed beams, orthogonal to the cavity axis,
a movable reflector positioned in one of said beams to reflect it back along itself and back through the partially reflecting surface to superimpose said two beams to form a single output beam, the spacing of the reflector from the cavity axis controlling the phase of the reflected beam and providing means for mode selection, and
a piezoelectric transducer upon which said reflector is mounted for providing modulation capability for said output beam by moving said reflector.

5. A frequency selective method for coupling the outputs of a plurality of laser resonant cavities each including a laser medium, a cavity axis and end reflectors, said method comprising the steps of:
partially reflecting a laser beam within each laser resonant cavity at 45° to the cavity axis for coupling energy out of said cavity in two coaxial oppositely directed beams, orthogonal to said cavity axis, and reflecting one of the beams back along itself to superimpose the two beams to form a single output beam.

6. A method of modulating the output beam of a laser resonant cavity including a laser medium, a cavity axis, and end reflectors, said method comprising the steps of:
partially reflecting a laser beam within the laser resonant cavity at 45° to the cavity axis for coupling energy out in two coaxial oppositely directed beams, orthogonal to the cavity axis, and
moving a reflecting means positioned in one of the beams to reflect it back along itself to superimpose the two beams to form a single output beam, the spacing of the reflecting means from the cavity axis controlling the phase of the modulated output signal.

7. A side mode suppressing optical maser comprising first and second reflective means arranged to form an optical resonator having an axis normal to said means;
an active medium disposed within said resonator;
said first reflective means comprising a single energy reflector;
said second reflective means comprising a three mirror secondary resonator excluding said active medium, whereby said second reflecting means can be arbitrarily small and can have reflectivity of correspondingly narrowband.

8. An optical maser according to claim 7 wherein one mirror of said three-mirror secondary resonator has a reflecting surface angled with respect to said axis and facing said active medium and hidden from a second mirror and a third mirror of said three-mirror secondary resonator.

* * * * *